United States Patent [19]

Kusmierz

[11] Patent Number: 4,519,723
[45] Date of Patent: May 28, 1985

[54] CONNECTING DEVICE FOR RELEASABLY SECURING AN AXLE ON A SUPPORT PLATE

[75] Inventor: Hans Kusmierz, Gilching, Fed. Rep. of Germany

[73] Assignee: Siemens Aktiengesellschaft, Berlin & Munich, Fed. Rep. of Germany

[21] Appl. No.: 464,913

[22] Filed: Feb. 8, 1983

[30] Foreign Application Priority Data

Mar. 19, 1982 [DE] Fed. Rep. of Germany ....... 3210024

[51] Int. Cl.³ .................. F16C 11/00; B41J 15/00; G03B 1/30
[52] U.S. Cl. ..................... 403/33; 403/316; 403/317; 403/330; 403/353; 400/616.2; 226/74; 198/860
[58] Field of Search ............... 403/197, 33, 323, 316, 403/317, 330, 353, 613; 384/275, 436, 437; 400/616.1, 616.2, 674; 198/860; 226/74, 75

[56] References Cited

U.S. PATENT DOCUMENTS

| 1,484,203 | 12/1922 | Barney | 400/674 |
| 3,333,726 | 8/1967 | Belanger . | |
| 4,009,507 | 3/1977 | Lascarrou | 403/353 |
| 4,014,426 | 3/1977 | Neufeld | 400/613 |
| 4,142,809 | 3/1979 | Shell | 403/353 |

FOREIGN PATENT DOCUMENTS

| 0035215 | 9/1981 | European Pat. Off. . | |
| 0089633 | 3/1983 | European Pat. Off. | 400/616.1 |
| 8033674 | 5/1981 | Fed. Rep. of Germany . | |
| 3008540 | 9/1981 | Fed. Rep. of Germany . | |
| 2826393 | 12/1981 | Fed. Rep. of Germany . | |

Primary Examiner—Cornelius J. Husar
Assistant Examiner—Todd G. Williams
Attorney, Agent, or Firm—Hill, Van Santen, Steadman & Simpson

[57] ABSTRACT

A connecting device for releasably securing an axle on a support plate comprising a bushing member rotatably receiving the axle, said bushing member being disposed in an aperture of a support plate, which aperture has an opening to the edge to form a narrow throat which has a dimension less than the diameter of the aperture. The bushing member has a cylindrical body with portions removed to form at least one flat surface and a retaining lever connected to the switching body in a relationship so that with the lever in a first position the body can be inserted through the narrow portion of the throat into the aperture and then rotate it to a second position locking the bushing member in the aperture.

8 Claims, 3 Drawing Figures

CONNECTING DEVICE FOR RELEASABLY SECURING AN AXLE ON A SUPPORT PLATE

BACKGROUND OF THE INVENTION

The invention is directed to a connecting device for releasably securing rods or axles on a support plate particularly for supporting an axle of a component of a printing device on a plate member.

A device for supporting and securing a rod or an axle on a support plate is disclosed in German Patentschrift No. 28 26 393. This device is used for fastening a form feeder in a desired position on a data printer or the like. The device includes lateral plates each having substantially U-shaped slots or mouths which can receive the axle of the platen of the printer when it is pushed therein. A spring loaded lever is pivotably attached to the lateral plate to move in a plane parallel to the lateral plate and this lever will move to a position to lock the axle of the platen in the mouth so that the form feeder is put in place with regard to the rest of the components of the data printer.

Such an arrangement is involved and requires a multitude of functioning parts. Thus, such an arrangement for releasably securing an axle on a support plate is expensive to manufacture because of the number of parts involved.

SUMMARY OF THE INVENTION

The present invention is directed to providing a connection device for releasably securing rods or axles on support plates which makes it possible to mount the axle within the support plate with a tool which moves perpendicular to the axle direction of the axle.

To accomplish these tasks, the invention is directed to a connecting device for releasably securing the axle on a support plate particularly for supporting an axle of a component of a printing device. The connecting device comprises a bushing member receiving the axle and supporting it for rotation; support means being disposed on the support plate for receiving and supporting said bushing, said support means comprising a substantially circular aperture of a given diameter adjacent an edge of the plate and connected to the edge by a throat having a dimension less than the given diameter of the aperture, said bushing member having a cylindrical body of said given diameter, said cylindrical body having at least one portion removed to provide a flat surface; a retaining lever connected to said bushing member and extending relative to the flat surface so that with the retaining lever in one position, said bushing member can be passed through the throat of the aperture to enable insertion and removal thereof, said lever having a second position rotating the bushing member to a second position to prevent removal of the bushing member from said aperture; and said lever and support plate having coacting latch means for holding the lever in said second position.

It is desirable that the bushing member and the retaining lever consist of a one-piece injection molded plastic part. This part can also include a flange-like retaining projection on the opposite portion of the cylindrical body from said lever to prevent axial movement of the bushing member in the aperture.

To prevent axial movement between the bushing member and the axle, retaining means are provided. The retaining means preferably comprise a groove in the axle and a retaining rib on the bushing member being received in said groove. The latch means preferably consist of a coacting projection and slot or opening. If the projection is placed on the retaining lever, then the aperture is on the side plate and the retaining lever can be sprung to allow removal of the projection therefrom. It is also possible that the projection is on the side frame or support plate and the aperture is provided in the retaining lever.

With the connecting device of the present invention, axle-seated components in a printing device can, for example, be connected to the appertaining support plates in a simple manner. Thus, the components can be easily plugged into the bearing openings formed by the apertures in the support plate with subsequent turning and latching of the retaining levers. Additional retaining elements are not required for this purpose.

DESCRIPTION OF THE PREFERRED EMBODIMENTS

Figure 1:
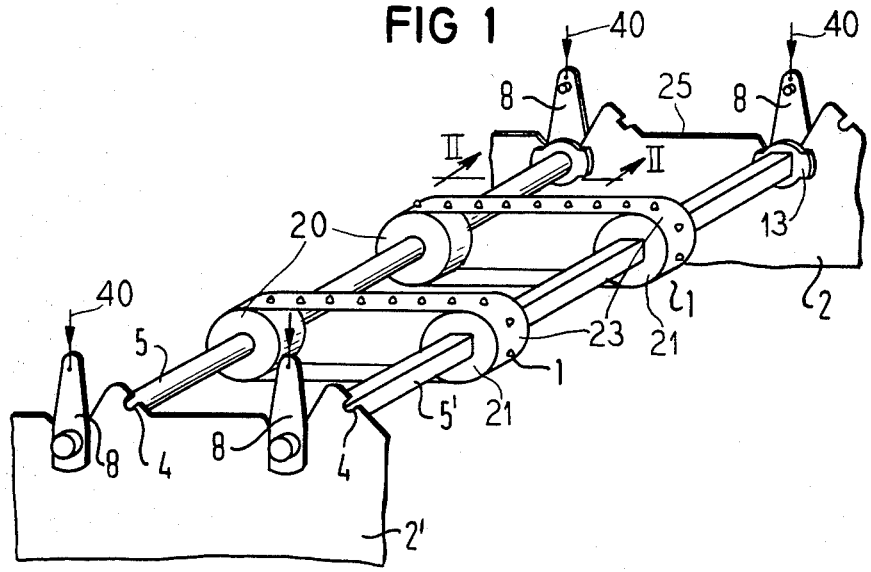
FIG. 1 is a perspective illustration of a paper feeding device for feeding endless paper, said device being secured in a printer housing by use of the connecting devices of the present invention.

The principles of the present invention are particularly useful for connecting and mounting a form feeding device 1 such as a tractor device in a printer housing which has a pair of parallel extending support plates 2. The forming feeding device 1 is illustrated as having a pair of parallel extending axles 5 and 5' with the axle 5' having a rectangular or square cross section. The axle 5 has a pair of pulleys or sheaves 20 mounted thereon and the axle 5' has a pair of pulleys or sheaves 21. Two belts 23 extend between the pulleys 20 and 21 and as illustrated have external projections for being received in perforated holes in the forms being fed. To mount the form feeding device, four connecting devices of the present invention are utilized.

Figure 2:
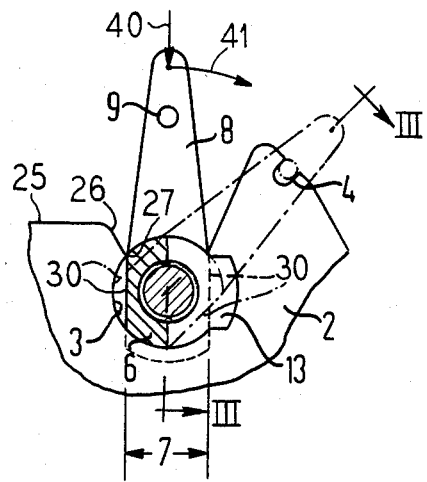
FIG. 2 is a view with portions broken away for purposes of illustration taken along lines II—II of FIG. 1

As best illustrated in FIG. 2, the connecting device includes a bushing member 6, a retaining lever 8 and means for mounting the bushing member in a support or side plate 2 and 2' of the printing device. As illustrated, the support means includes an aperture 3 which is of a given diameter and is positioned in each of the plates such as 2 and 2' adjacent an edge 25. Each of the apertures 3 is in communication or is connected by a throat or opening 26 to the edge 25. As illustrated, this opening or throat 26 has a narrow portion 27 of a dimension 7 which is substantially less than the given diameter of the aperture 3.

The bushing member 6 has a cylindrical body of the same diameter as the given diameter of the aperture 3. As illustrated, the cylindrical body of the bushing 6 has diametrically opposite portions removed to furnish flat surfaces 30 which are spaced apart the distance 7 of the narrow portion 27 of the opening or throat. While it is illustrated that opposite portions have been flattened, it is possible that only a single flat surface is provided to provide a dimension at right angles of the surface which is less than the given diameter and equal to the dimension 7. The lever 8 is connected to the body portion 6 and has a projection 9. Preferably as illustrated, the bushing member 6 also includes a flange-type retaining projection 13 which lies on the opposite side of the plate 2 from the lever 8 and coacts with the lever 8 to form means for maintaining the bushing member in the desired axial position in the aperture 3. In the preferred embodiments, the bushing member 6, the flange retaining projections 13 and the lever 8 are all formed as a one-piece molded body such as of a plastic material. Such a molding can be done by a common injection molding practice.

Figure 3:
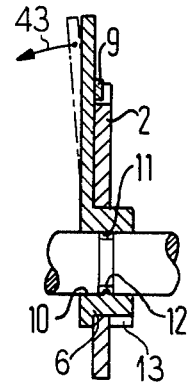
FIG. 3 is a cross-sectional view taken along lines III—III of FIG. 2.

As illustrated in FIG. 2, the lever 8 is in the first position which enables insertion and removal of the bushing member 6 into and out of the aperture 3 as indicated by the arrow 40. Once the bushing member is placed in the aperture 3, the lever 8 can be rotated in the direction of arrow 41 to a second position which is shown in chain lines with portions removed for purposes of illustration in FIG. 2. In this position, the flat surfaces 30 are rotated out of alignment with the throat 27 so that the bushing will be locked or retained in the aperture 3. To hold the lever 8 in the second position, latch means on the lever and the side are provided. As illustrated, the latch means include a projection 9 which is received in a slot or opening 4 in the member 2. It is also possible to reverse this and put the opening in the lever 8 to receive a projection on the plate 2. In order to enable insertion of the projection 9 into and out of the slot 4, as the lever is being moved into and out of the second position it can be deflected or bent in the direction indicated by the arrow 43 (FIG. 3).

In order to prevent axial displacement of the axle 5 in the bushing member 6, the bushing or bearing surface 10 of the member 6 has one or more retaining ribs 11 which are received in an annular groove 12 of the axle. As illustrated, this rib 11 is an integral part of the member 6 although it could be formed by a pin being inserted through the bushing member 6.

In order to assemble the form feeder 1 on the support plates 2 and 2', the retaining levers 8 and the bushing 6 are assembled on the axles 5 and 5'. After this assembly, the levers 8 are moved to the first position or vertical position as illustrated in FIGS. 1 and 2 so that the bushing members 6 present the narrowest diameter for passage through the throats 27. With the levers 8 in the first position, the assembly can be moved in a direction of arrows 40 to insert each of the bushings 6 into the respective apertures 3. After insertion, a turning of the retaining lever 8 in the direction 41 to the second position will positively lock each of the bushing members 6 and their respective axles 5 and 5' in the plates 2 and 2'. To hold the levers 8 in the locking position, the latch means has a projection 9 received in the slot 4.

An advantage of the above described device is that the multitude of parts of the previous connecting device is replaced by the bushing 6, the lever 8 and the retaining flange 13 which are received in the specially designed apertures 3. Thus, a reduced number of parts are necessary and if the retaining lever 8, the bushing member 6 and the flanges 13 are a one-piece integrally injection molded plastic part, then the number of parts is greatly reduced with a corresponding reduction in cost.

Although various minor modifications may be suggested by those versed in the art, it should be understood that I wish to embody within the scope of the patent granted hereon, all such modifications as reasonably and properly come within the scope of my contribution to the art.

I claim:

1. A connecting device for releasably securing an axle on a support plate particularly for supporting an axle of a component of a printing device, said connecting device comprising a bushing member having a bore for receiving the axle and supporting it for rotation; retaining means for preventing axial displacement of the axle in the bore of the bushing; support means being disposed on the support plate for receiving and supporting said bushing member, said support means comprising a substantially circular aperture of a given diameter adjacent an edge of the plate and connected to the edge by a throat having a dimension less than the given diameter of said aperture, said bushing member having a cylindrical body of said given diameter, said cylindrical body having at least one portion removed to provide a flat surface; a retaining lever being connected to said bushing member and extending relative to the flat surface so that with the retaining lever in one position, said bushing member can be passed through the throat of the aperture to enable insertion and removal thereof, said lever having a second position rotating the bushing member to a second position to prevent removal of the bushing member from said aperture; means including the lever for maintaining the bushing member in a desired axial position in the aperture; and said lever and support plate having coacting latch means for holding the lever in said second position, said latch means including one of said lever and support plate having a projection being received in an opening on the other of said lever and support plate, said lever being deflectable in a direction toward said axle to enable insertion of the projection into the opening.

2. A connecting device according to claim 1, wherein the bushing member and retaining lever consist of an injected molded one-piece part.

3. A connecting device according to claim 2, wherein said retaining means include a groove in the axle and an internal rib in the bore of the bushing member received in said groove.

4. A connecting device according to claim 3, wherein said means for maintaining includes an integral flange on the end of the bushing member opposite the retaining lever.

5. A connecting device according to claim 4, wherein the projection is disposed on the retaining lever and the opening is a slot on the support plate.

6. A connecting device according to claim 1, wherein said retaining means include a groove in the axle and an internal rib in the bore of the bushing member received in said groove.

7. A connection device according to claim 6, wherein said means for maintaining include a retaining flange positioned on the end of the bushing member opposite the retaining lever.

8. A connecting device according to claim 1, wherein the projection is disposed on the retaining lever and the opening is in the support plate.

* * * * *